(12) United States Patent
Aki (10) Patent No.: US 9,598,208 B2
(45) Date of Patent: Mar. 21, 2017

(54) DISPOSABLE BUCKET LINER

(71) Applicant: Brannon K. Aki, Denver, CO (US)

(72) Inventor: Brannon K. Aki, Denver, CO (US)

( * ) Notice: Subject to any disclaimer, the term of this patent is extended or adjusted under 35 U.S.C. 154(b) by 34 days.

(21) Appl. No.: 14/458,908

(22) Filed: Aug. 13, 2014

(65) Prior Publication Data

US 2015/0048093 A1     Feb. 19, 2015

Related U.S. Application Data

(60) Provisional application No. 61/866,442, filed on Aug. 15, 2013.

(51) Int. Cl.
*B65D 25/16*     (2006.01)
*B65D 33/25*     (2006.01)

(52) U.S. Cl.
CPC ......... *B65D 25/16* (2013.01); *B65D 33/2508* (2013.01); *Y02W 30/807* (2015.05)

(58) Field of Classification Search
CPC   B65D 25/16; B65D 33/2508; B65D 33/2541; B65D 33/2575; A61J 9/001; Y02W 30/807
USPC ................ 383/33, 67, 207–209; 220/495.11; 141/10
See application file for complete search history.

(56) References Cited

U.S. PATENT DOCUMENTS

| | | | |
|---|---|---|---|
| 2,188,111 A | 1/1940 | Grandinetti | |
| 2,923,404 A * | 2/1960 | Adell | B65D 75/5816 206/459.5 |
| 3,146,912 A | 9/1964 | Twersky | |
| 3,227,305 A | 1/1966 | Enssle | |
| 3,276,671 A * | 10/1966 | Fleitman | B65D 65/22 206/521 |
| 3,323,707 A | 6/1967 | King | |
| 3,640,381 A * | 2/1972 | Kanada | B65D 33/02 229/117.31 |
| 3,905,476 A * | 9/1975 | Foreman | B44D 3/121 141/390 |
| 4,122,973 A | 10/1978 | Ahern | |
| 4,298,134 A * | 11/1981 | Lewis, Jr. | B44D 3/12 220/495.02 |
| 4,461,402 A | 7/1984 | Fell et al. | |
| 4,747,701 A | 5/1988 | Perkins | |

(Continued)

OTHER PUBLICATIONS

5 Gallon LDPE Pail Linver 18"×15"×4 Mil, U.S. Plastic Corp., Copyright 2013, printed from the Internet on Dec. 19, 2013, 2 pp.

(Continued)

*Primary Examiner* — Anthony Stashick
*Assistant Examiner* — Madison L Poos
(74) *Attorney, Agent, or Firm* — James A. Sheridan; Sheridan Law, LLC (57) ABSTRACT

The disclosure provides apparatus and methods of use pertaining to disposable bucket liners for storing solid or liquid content. One embodiment provides a flexible bag configured to conform to an interior of a common painting bucket and overlap an open top end of the bucket so as to provide stability for the bag and protection for the bucket. The bag includes a reusable closing member that allows the bag to be removed from the bucket and stored to facilitate repeated use before disposal. Other embodiments are also disclosed.

8 Claims, 8 Drawing Sheets

(56) References Cited

U.S. PATENT DOCUMENTS

| | | | |
|---|---|---|---|
| 4,903,718 A * | 2/1990 | Sullivan | A61C 17/036 134/184 |
| 4,953,704 A | 9/1990 | Cortese | |
| 5,046,749 A | 9/1991 | Owens | |
| 5,060,803 A | 10/1991 | Beer et al. | |
| 5,143,242 A | 9/1992 | Millasich | |
| 5,305,909 A * | 4/1994 | Merritt | B44D 3/12 220/216 |
| 5,611,626 A * | 3/1997 | Warr | B65D 33/08 383/10 |
| 5,727,708 A | 3/1998 | Erickson | |
| 5,816,501 A | 10/1998 | LoPresti et al. | |
| 5,882,120 A * | 3/1999 | Bell | B65D 75/008 383/10 |
| 6,007,246 A * | 12/1999 | Kinigakis | B65D 33/2533 383/104 |
| D425,277 S | 5/2000 | Kent | |
| 6,151,910 A * | 11/2000 | Hazen | B65D 81/3876 220/495.03 |
| 6,176,613 B1 * | 1/2001 | Chen | B65D 33/00 206/522 |
| 6,206,571 B1 * | 3/2001 | Olin | B65D 33/2533 383/204 |
| 6,260,730 B1 | 7/2001 | Fellman | |
| 6,679,398 B1 | 1/2004 | O'Brien | |
| 6,899,239 B1 * | 5/2005 | Gray | A61J 9/001 215/11.3 |
| 6,899,460 B2 * | 5/2005 | Turvey | B65D 33/007 383/33 |
| 7,112,764 B2 | 9/2006 | Garcia | |
| 7,159,734 B1 * | 1/2007 | O'Brien | B65D 25/16 220/495.07 |
| D545,689 S * | 7/2007 | Peel | B65D 33/10 D9/707 |
| 7,419,300 B2 * | 9/2008 | Pawloski | B65D 33/10 383/10 |
| D586,058 S | 2/2009 | Bechtold, Jr. | |
| 7,524,111 B1 | 4/2009 | Williams | |
| 7,565,985 B2 | 7/2009 | Lucey | |
| D607,624 S | 1/2010 | Bergman | |
| 7,658,542 B2 | 2/2010 | Risgalla | |
| 8,070,359 B2 * | 12/2011 | Taheri | B29C 66/432 383/105 |
| D656,697 S | 3/2012 | McNeil | |
| D659,014 S * | 5/2012 | Blythe | B65D 33/10 D9/709 |
| 8,281,952 B2 | 10/2012 | Robellard et al. | |
| 8,529,129 B2 * | 9/2013 | Turvey | B65D 33/2541 383/44 |
| 8,602,649 B2 | 12/2013 | Schmal et al. | |
| 2001/0014187 A1 | 8/2001 | Takahashi et al. | |
| 2002/0145086 A1 * | 10/2002 | Alvarado | B65B 43/14 248/95 |
| 2003/0044093 A1 * | 3/2003 | Schneider | B65D 33/2591 383/5 |
| 2003/0148004 A1 | 8/2003 | Kawaguchi et al. | |
| 2003/0169947 A1 * | 9/2003 | Taheri | B65D 33/004 383/5 |
| 2004/0169042 A1 | 9/2004 | Garcia | |
| 2004/0208398 A1 * | 10/2004 | Ichikawa | B29C 45/14336 383/63 |
| 2005/0129338 A1 * | 6/2005 | Sprehe | B65D 33/2541 383/203 |
| 2005/0135712 A1 * | 6/2005 | Barbier | B65D 77/30 383/78 |
| 2005/0185863 A1 * | 8/2005 | Carrillo | A45C 13/02 383/10 |
| 2006/0029299 A1 * | 2/2006 | Share | B29C 65/08 383/63 |
| 2006/0096989 A1 | 5/2006 | Lucey | |
| 2006/0182369 A1 * | 8/2006 | Schneider | A45C 13/1023 383/10 |
| 2006/0188177 A1 * | 8/2006 | Dyer | B65D 33/08 383/10 |
| 2006/0262998 A1 | 11/2006 | Horak | |
| 2007/0127851 A1 * | 6/2007 | Tilman | B65D 33/2591 383/5 |
| 2008/0307614 A1 * | 12/2008 | Dais | B65D 33/2541 24/443 |
| 2008/0310771 A1 * | 12/2008 | Dais | B65D 33/2508 383/59 |
| 2009/0152139 A1 * | 6/2009 | Roesink | A24F 23/02 206/260 |
| 2009/0190867 A1 * | 7/2009 | Goto | B65D 33/2508 383/211 |
| 2009/0232421 A1 * | 9/2009 | Turvey | B65D 77/225 383/44 |
| 2009/0232423 A1 * | 9/2009 | Sabounjian | B65D 33/2541 383/100 |
| 2009/0317022 A1 | 12/2009 | MacKay | |
| 2010/0187234 A1 | 7/2010 | Saranga | |
| 2010/0236026 A1 * | 9/2010 | Nanba | B65D 33/2575 24/30.5 L |
| 2010/0266224 A1 * | 10/2010 | Nanba | B65D 33/2533 383/204 |
| 2010/0290720 A1 * | 11/2010 | Ichikawa | B65D 33/2508 383/64 |
| 2010/0296754 A1 * | 11/2010 | Chiu | B65D 33/105 383/10 |
| 2011/0069911 A1 * | 3/2011 | Ackerman | A45C 11/20 383/64 |
| 2011/0085747 A1 * | 4/2011 | Dais | B65D 81/2023 383/63 |
| 2011/0293207 A1 * | 12/2011 | Edwards | B65B 51/146 383/201 |
| 2012/0045153 A1 * | 2/2012 | Schmal | A47J 36/16 383/118 |
| 2012/0279941 A1 * | 11/2012 | Sprehe | A61J 9/001 215/365 |
| 2013/0089647 A1 * | 4/2013 | Baret | B65D 33/2508 426/412 |

OTHER PUBLICATIONS

5 Gallon Pail Liner, Sherwin-Williams, printed from the Internet on Dec. 19, 2013, 3 pp.

10-5 Gallon Mylar Bags and 10-2000cc Oxyfree Oxygen Absorbers for Dried Dehydrated and Long Term Food Storage by Oxyfree, printed from the Internet on Dec. 19, 2013, 8 pp.

5 Gallon Bucket Liner for Marinading and Brining, printed from the Internet on Dec. 19, 2013, 3 pp.

Dripless The Big Dawg Multi Liner Bucket with 24 Liners, 5 Gallon Pail, by Dripless, printed from the Internet on Dec. 19, 2013, 3 pp.

LinerPro Round Bottom Pail Liners, CDF Corporation, Copyright 2012, printed from the Internet on Dec. 19, 2013, 2 pp.

Ziploc brand Big Bags, S.C. Johnson & Son, Inc., Copyright 2013, printed from the Internet on Dec. 19, 2013, 2 pp.

Tie-Top 5 Gallon LDPE 4 Mil Round Bottom Flexible Liners 400 Pack, Baytec Containers, Copyright 1983-2014, printed from the Internet on Dec. 19, 2013, 2 pp.

* cited by examiner

DISPOSABLE BUCKET LINER

REFERENCE TO PENDING PRIOR PATENT APPLICATION

This application claims the benefit under 35 U.S.C. 119 (e) of U.S. Provisional Patent Application No. 61/866,442, filed Aug. 15, 2013 by Brannon K. Aki for "DISPOSABLE BUCKET LINER" which patent application is hereby incorporated herein by reference.

BACKGROUND

Generally, both professional and do-it-yourself painters must spend substantial time cleaning their various tools and containers at the close of a painting session or when switching between paint colors. Such tools and containers may include brushes, rollers, pans, sponges, buckets, and more.

Buckets are particularly difficult to clean in a manner that leaves the bucket free of dried, clumped, and/or crusted paint at the start of the next painting session. Primarily, painting buckets are generally deep five-gallon containers with a great deal of surface area to be cleaned. These size and depth complications are exacerbated when excess paint, which has been wiped from brushes, rollers, and the like, dries into the upper ridges or edges of the bucket. As a result, a painter must either expend valuable time and effort cleaning the internal surfaces and the external ridges of the bucket to render the bucket reusable or dispose of the bucket altogether. For professional painters charging between $35.00 and $50.00 per hour, a half-hour spent cleaning equipment at the end of the day and/or between each color change amounts to a sizeable production loss.

Beyond the time required to clean painting buckets when a painter is stopping for the day, breaking for a period of time, or changing paint colors to continue a job, bucket cleaning requires a great deal of water and an appropriate dump site. Many commercial job sites are not equipped with running water due to staged construction and/or other practical job-site complications. Other job sites don't have appropriate drainage facilities that can accommodate gallons and gallons of paint-tainted water.

Because cleaning a painting bucket between each paint session disposes of the paint coating the bottom, sides, and ridges of the bucket, each cleaning sacrifices a nominal amount of paint. Over time, this amount of washed-away paint adds up to a significant amount of waste.

Disposable bucket liners may provide an alternative to cleaning a paint-coated bucket in preparation for reuse. Using a disposable liner, a painter may complete a job and simply dispose of the liner before replacing it with a new one and continuing on with a new paint color or restarting the project after a break or delay in work. That said, current disposable liners, plastic bags, and/or other disposable receptacles exhibit numerous deficiencies. Generally, liners that are sized and configured to fit the inside of a painting bucket have a height that stops short of the height of the bucket so as not to interfere with the bucket's lid. As a result, the liners don't overlap or fold over the bucket rim, which allows the liners to shift position when paint is poured inside and fails to protect the top rim and the outer ridges encircling the top of the bucket. In addition, existing liners are designed for one-time use and do not feature reusable closure mechanisms that allow for the removal, storage, and later reuse of the paint-filled liners. As a result, they don't allow a painter to quickly and easily store unused paint remaining in the liner during a work stoppage, either for a break, and evening, or while the painter switches between paint colors.

Due to these drawbacks, there is a need for an affordable, disposable mechanism for keeping a paint bucket clean over the course of multiple uses and for allowing paint and painting tools to be stored for easy reuse between painting sessions and color changes.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

On embodiment provides a disposable liner for a five-gallon bucket having a bottom surface, inner and outer sidewalls, and an open top end. The liner may include a flexible bag having a bottom seam, a top periphery, and a reusable closure member that moves between open and closed positions. When the bag is placed within the bucket and the reusable closure member is placed in the open position, the bottom seam connects with the bottom surface of the bucket and the top periphery folds over the open top end of the bucket such that the reusable closure member abuts the outer sidewall of the bucket.

Another embodiment provides a bucket-and-liner system including a bucket having a bottom surface, inner and outer sidewalls, and an open top end. The system further includes a disposable bag configured to line the bottom surface and the inner sidewall of the bucket. The disposable bag may have flexible walls disposed between a bottom seam and a top periphery and a reusable closure member configured to move between open and closed positions. The flexible walls may be configured to extend across the bottom surface, up the inner sidewall, and over the open top end of the bucket such that the reusable closure member abuts the outer sidewall when the disposable liner is placed within the bucket and the reusable closure member is in the open position.

Yet another embodiment provides a method of applying paint contained within a painting bucket having a bottom surface, inner and outer sidewalls, and an open top end. The method begins with providing a liner system including a disposable bag having flexible walls disposed between a bottom seam and a top periphery and a reusable closure member configured to move between open and closed positions. The method continues with moving the reusable closure member to the open position and placing the disposable bag within the bucket such that the bottom seam connects with the bottom surface of the bucket and the top periphery folds over the open top end of the bucket such that the reusable closure member abuts the outer sidewall of the bucket. Next, the method includes filling the disposable bag with a desired amount of paint, applying the paint to a surface, and, when finished with application of that particular color, moving the reusable closure member to the closed position. Once the disposable bag is closed, the method continues with removing the disposable bag from the bucket for storage outside the bucket. After storage for a desired amount of time, either for a work stoppage or while the user paints in a different color, the method continues with replacing the disposable bag back within the bucket and moving the reusable closure member to the open position.

An additional embodiment provides a method of storing liquid or solid matter contained within a bucket-and-liner system including (a) a five-gallon bucket having a bottom surface, inner and outer sidewalls, and an open top end, and (b) a re-sealable liner sized to fit the bottom surface and inner sidewall of the bucket and extend beyond the open top end of the bucket. The liner may include a reusable closure member configured to move between open and closed positions. The method begins with moving the reusable closure member from the open position to the closed position before removing the re-sealable liner from said bucket.

Other embodiments are also disclosed.

Additional objects, advantages, and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Various embodiments of the systems and methods described herein relate to the application and storage of paint in a manner that saves time and money and reduces the resources (e.g., water, drainage, excess paint, etc.) traditionally required to complete these tasks.

Figure 1:
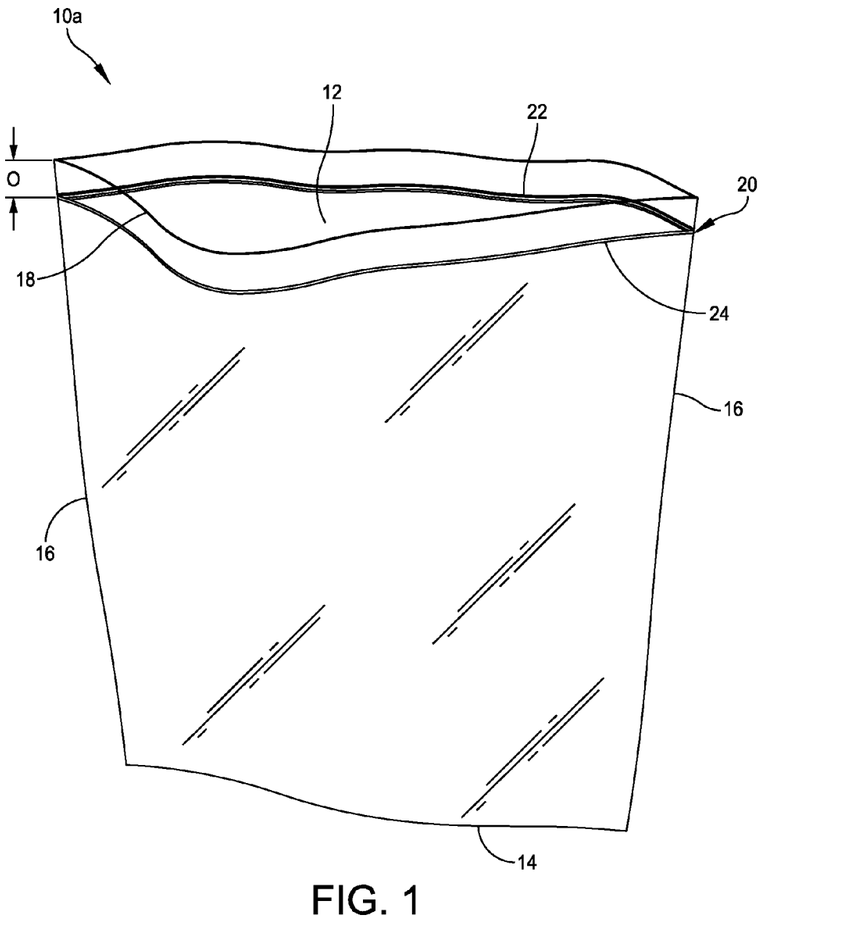
FIG. 1 provides a front perspective view of one embodiment of a disposable bucket liner.

FIG. 1 illustrates a front perspective view of one embodiment of a disposable liner $10_a$. In this embodiment, liner $10_a$ may be an impermeable, disposable bag having two flexible walls 12 that meet at a bottom seam 14 and identical side seams 16. These bottom and side seams 14, 16 may open to form a top periphery 18. Flexible walls 12 may be formed of any appropriate plastic such as, for example, polyethylene and may have any appropriate thickness. In one embodiment, flexible walls 12 have a thickness between 2 and 4 mil.

To render liner $10_a$ re-sealable, and thus useful for long and/or short-term storage of liquid and/or solid content, a reusable closure member 20 may traverse top periphery 18 at any appropriate offset, o, from top periphery 18. In this embodiment, reusable closure member 20 includes a zip-type lock formed of a grooved track 22 that interlocks via a press-fit with a ridged track 24. Reusable closure member 20 is configured to move repeatedly through open and closed positions via a press fit, thereby allowing a user to access and then store liquid or solid content 34 as many times as necessary until the user has finished with content 34 and is ready to dispose of liner $10_a$.

Figure 2:
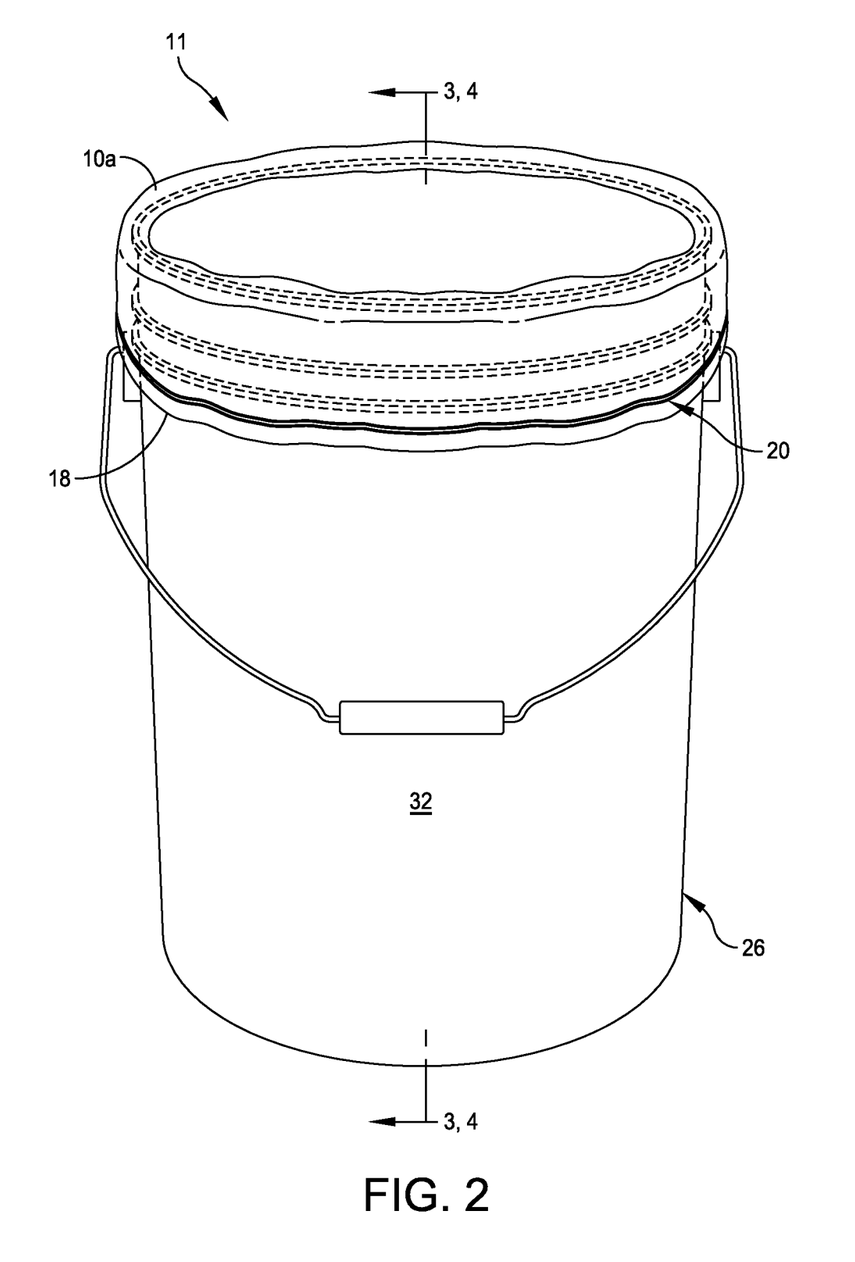
FIG. 2 provides a front perspective view of a bucket-and-liner system featuring the disposable bucket liner of FIG. 1.
Figure 3:
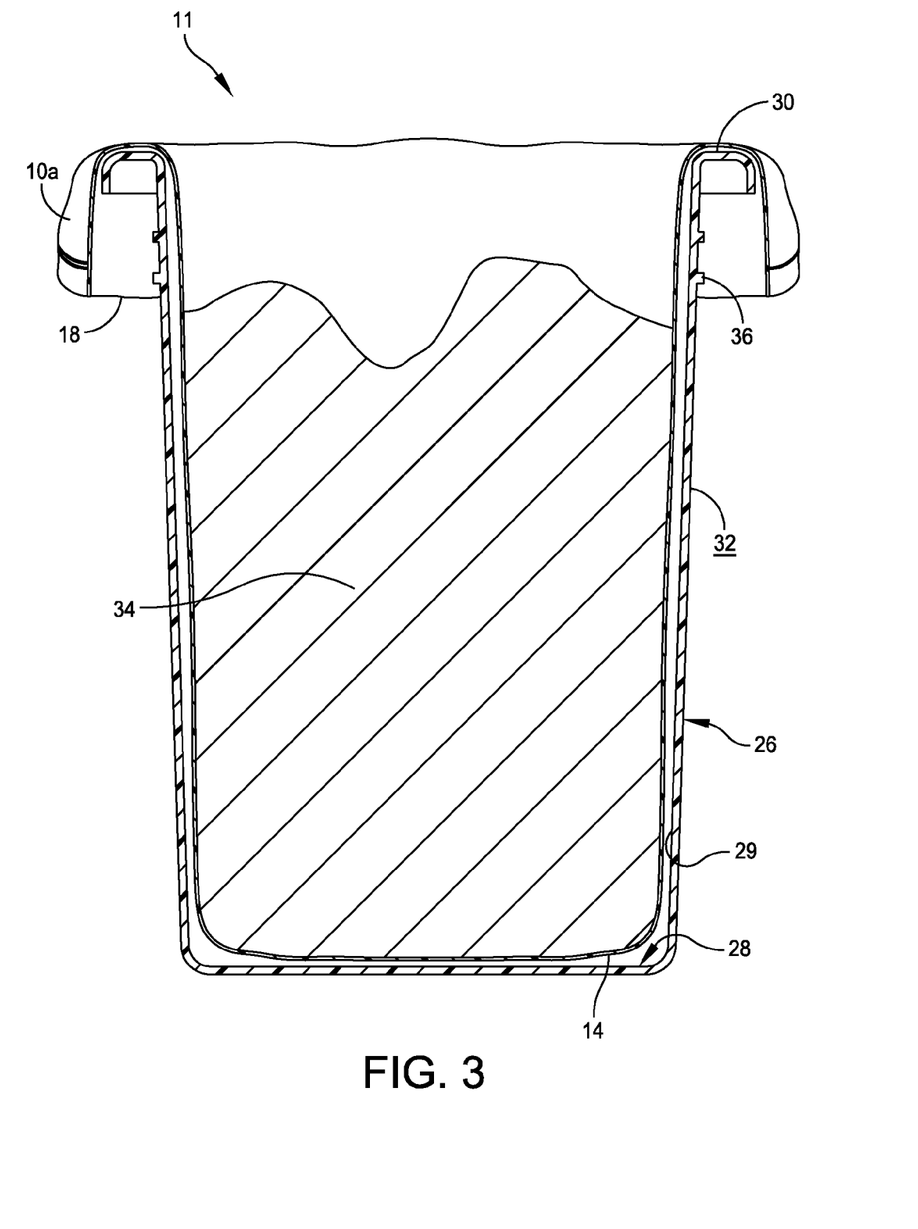
FIG. 3 provides a section view of the bucket-and-liner system of FIG. 2.
Figure 4:
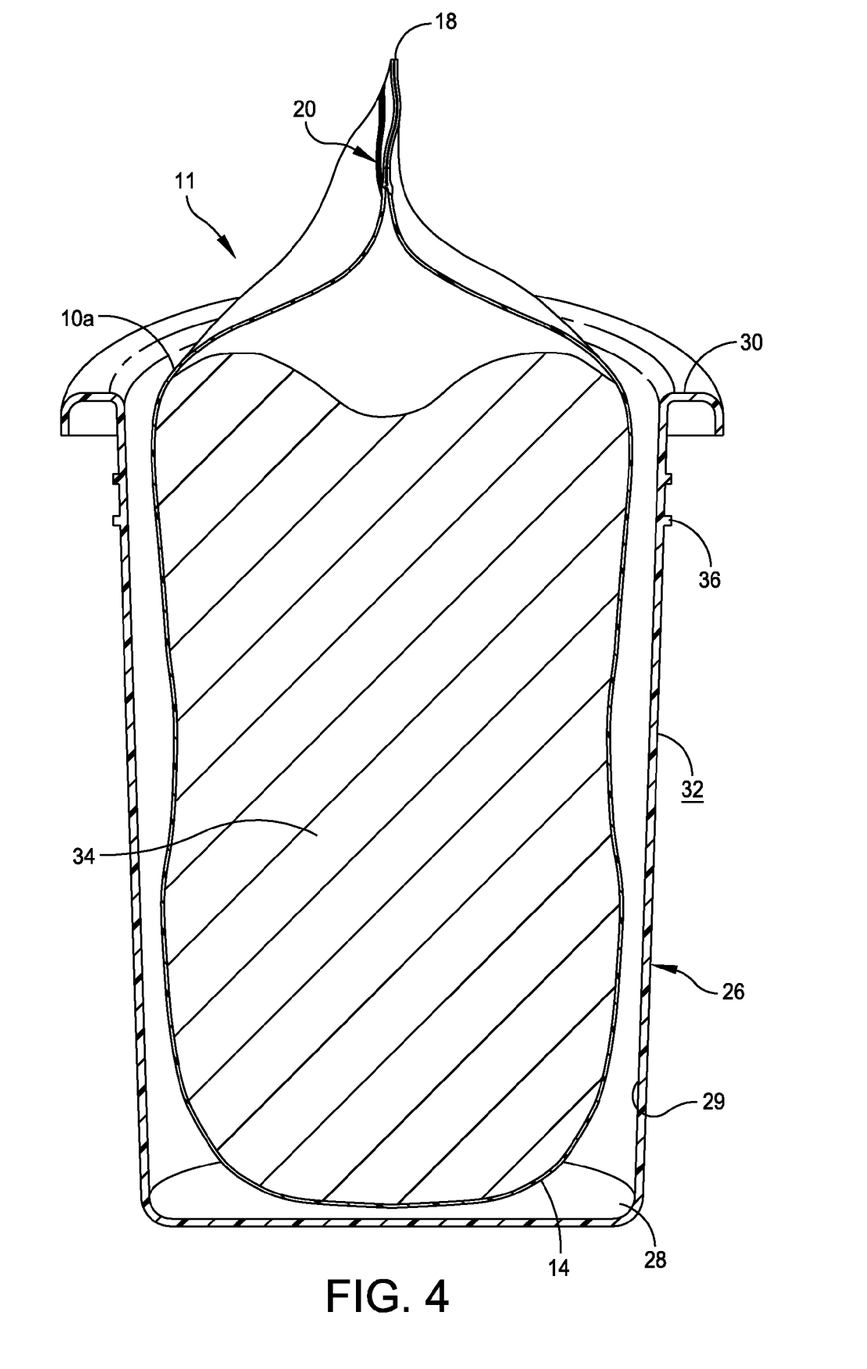
FIG. 4 provides another section view of the bucket-and-liner system of FIG. 2.

FIGS. 2-4 illustrate perspective and section views of one embodiment of a bucket-and-liner system 11. Specifically, FIGS. 2-3 show liner $10_a$ in an open position and situated within a five-gallon bucket 26, which is a common tool present on construction, remodeling, and other job sites where liner $10_a$ might prove useful. These drawing views illustrate the sizing of liner $10_a$ in relation to bucket 26. Specifically, Liner $10_a$ may be sized such that when placed within bucket 26, bottom seam 14 may contact a bottom surface 28 and an inner sidewall 29 of bucket 26 (FIG. 3). At the same time, top periphery 18 of liner $10_a$ may overlap or fold over an open top end 30 of bucket 26 in a manner that allows reusable closure member 20 to abut an outer sidewall 32 of bucket 26. This overlap allows bucket 26 to perform as a scaffolding of sorts for liner $10_a$. That is, when content 34 is added to liner $10_a$, the overlap prevents liner $10_a$ from shifting as liner $10_a$ expands to accommodate content 34 and conform to the inside of bucket 26. This overlap remains as content 34 is added, preventing content 34 from contaminating or interfering with either closure member 20 or any ridges 36 that are present on outer sidewall 32 of bucket 26.

To accommodate a traditional five-gallon painting bucket, each flexible wall 12 of liner $10_a$ may be 21.5 inches long. However, liner $10_a$ may be any appropriate size, shape, length, width, and/or configuration to allow for sufficient overlap when bottom seam 14 of liner $10_a$ contacts bottom surface 28 of bucket 26 and liner $10_a$ expands to conform to inner sidewall 29 of bucket 26. For instance, while FIGS. 1-4 show liner $10_a$ as a flat bag with three distinct seams, it should be understood that liner $10_a$ may take a cylindrical, square, oval, or any other appropriate shape.

With liner $10_a$ in place within bucket 26, content 34, such as, for example, paint may be added to liner $10_a$ and bucket 26 without fear of dripping or smearing excess paint onto inner sidewall 29 or open top end 30 of bucket 26. Further, the overlap protects ridges 36 of outer sidewall 32 when a painter leverages open top end 30 to wipe excess paint from brushes, rollers, sponges, and the like. As a result, when liner $10_a$ is later removed, bucket 26 remains clean and ready for another liner, and thus another paint project or color, or for any appropriate secondary use such as carrying water or storing other equipment (e.g., paint trays, brushes, sponges, etc.).

FIG. 4 illustrates a section view of bucket-and-liner system 11, where liner $10_a$ is situated within bucket 26 in a closed position. From this closed position, liner $10_a$ may be lifted from bucket 26 for storage. For instance, a professional painter could remove liner $10_a$ and replace it with another liner before moving to another paint color. Later the painter could return to the original color contained within liner $10_a$, all by quickly switching liners with no need to spend valuable time cleaning bucket 26 between each color change. Alternatively, the painter might remove liner $10_a$ from bucket 26 to store paint during a break or overnight. In this situation, the painter could store other tools such as brushes and a paint tray within the clean bucket 26.

Figure 5:
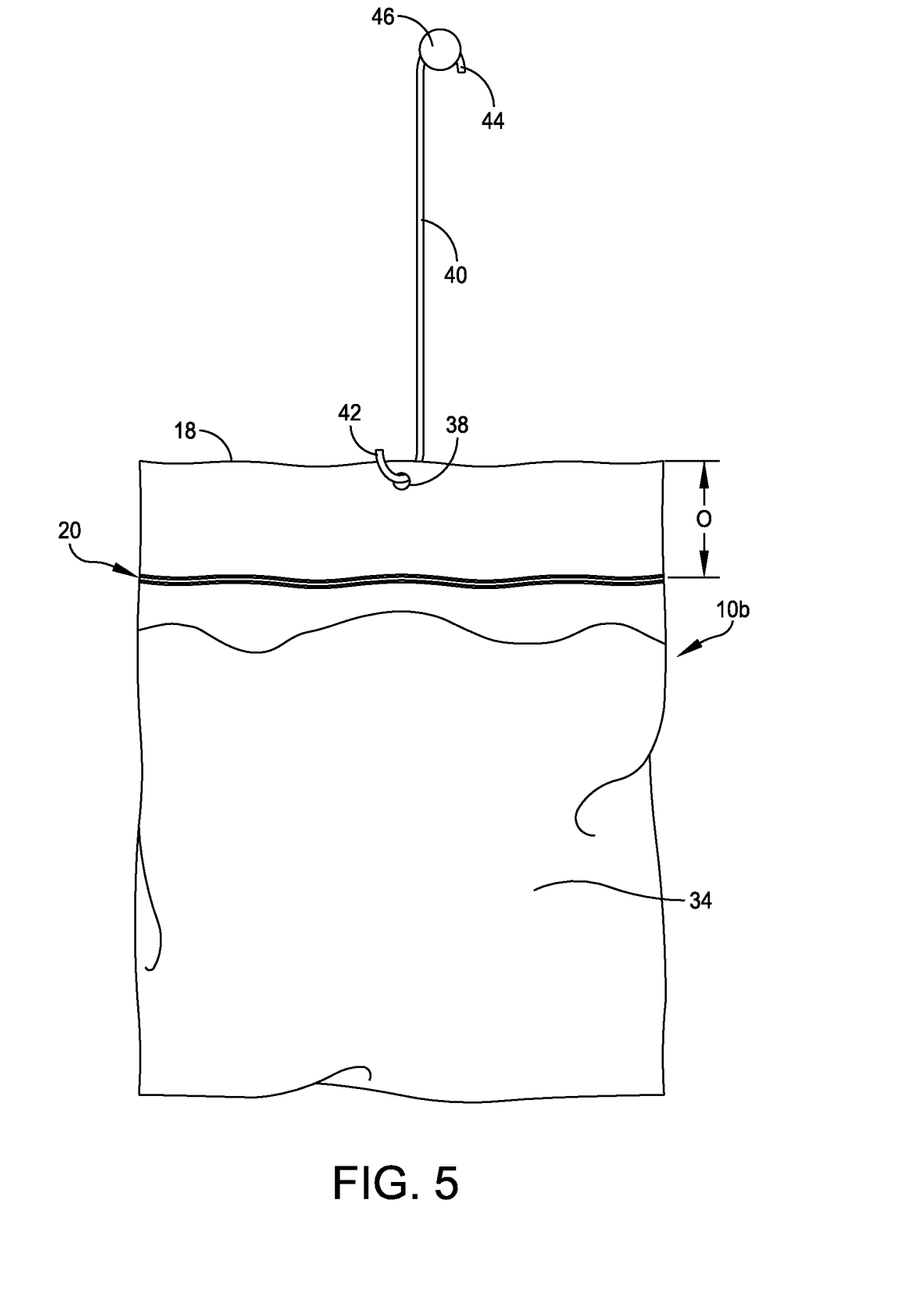
FIG. 5 provides a front perspective view of another embodiment of a disposable bucket liner held upright by a stability hanger.

When the liner is removed from bucket 26, it may be beneficial to store it in an upright position so as to keep content 34 away from reusable closing member 20. FIG. 5 illustrates one embodiment of a disposable liner $10_b$ that includes a stability aperture 38 situated between reusable closure member 20 and top periphery 18 of liner $10_b$. In this embodiment, stability aperture 38 is adapted to engage with a stability hanger 40. One embodiment of stability hanger 40 may include a first hook 42 and a second hook 44. As shown in FIG. 5, first hook 42 may be curved in a manner adapted to engage with stability aperture 38, while second hook 44 may be curved in a manner adapted to engage with a fixed external surface 46, such as a doorknob, shelf edge, or the like. While FIG. 5 shows stability hanger 40 specifically adapted for a doorknob, stability hanger 40 may take any appropriate size, shape, and/or configuration necessary to support liner $10_b$ in an upright position. Further, stability hanger 40 may be formed of any appropriate material such as, for example, metal or plastic. In attrition, while FIG. 5 shows one stability aperture 38, embodiments of liner $10_b$ may include any number of stability apertures 38 necessary to achieve a stable upright resting position.

Figure 6:
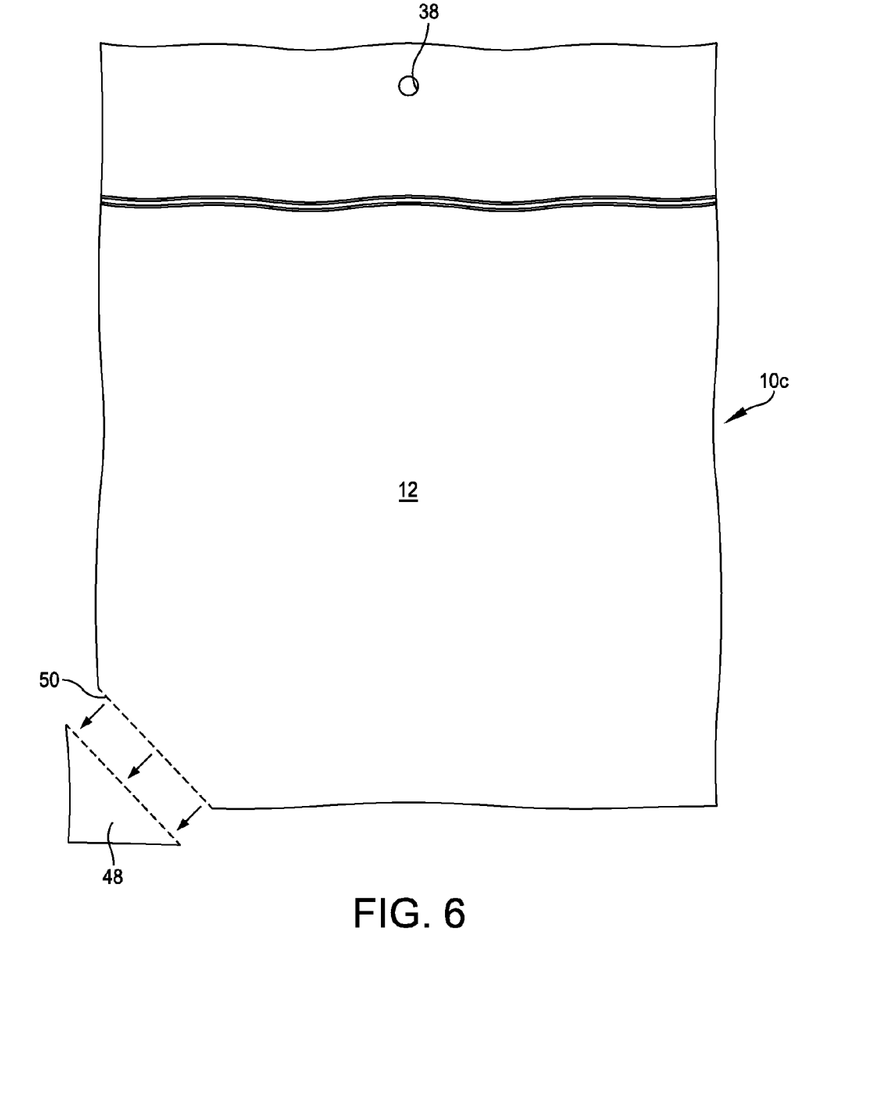
FIG. 6 provides a front plan view of another embodiment of a disposable bucket liner.

At the close of a project, a user may throw away the disposable liner. In the case of liquid content 34, the user may want to fully empty the liner before disposal. FIG. 6 illustrates a front plan view of one embodiment of a liner $10_c$. Liner $10_c$ may include a tear-away portion 48 that separates from flexible sheets 12 via a perforated line 50. Once the tear-away portion has been removed, the user may squeeze liner $10_c$ to efficiently remove all remaining liquid from the bag before disposal. For example, a user may remove tear-away portion 48 before squeezing all remaining paint within liner $10_c$ back into its original can, thereby minimizing waste.

Embodiments of liner $10_{a-c}$ allow users to integrate readily available five-gallon buckets into projects that would otherwise require a great deal of clean-up and/or several different buckets to achieve. For instance, rather than using one bucket and cleaning it between each color required of a multi-color paint job, or alternately, employing several painting buckets and cleaning each one at the end of the day or at the end of a work session, a painter may employ one bucket and multiple liners $10_{a-c}$. By alternating liners for each color and storing the liners during work stoppages, as discussed above, the painter may maximize his or her painting time and avoid the need for abundant rinse water, drainage outlets, and/or multiple buckets to be juggled and cleaned.

Notably, while liners $10_{a-c}$ have primarily been discussed with reference to storing paint and its usefulness in the personal and professional painting environment, liners $10_{a-c}$ and bucket-and-liner system 11, discussed above, may be used with any appropriate solid or liquid content 34. For instance, embodiments of liners $10_{a-c}$ may be used to store pet waste or soiled baby diapers between trash-removal days.

Figure 7:
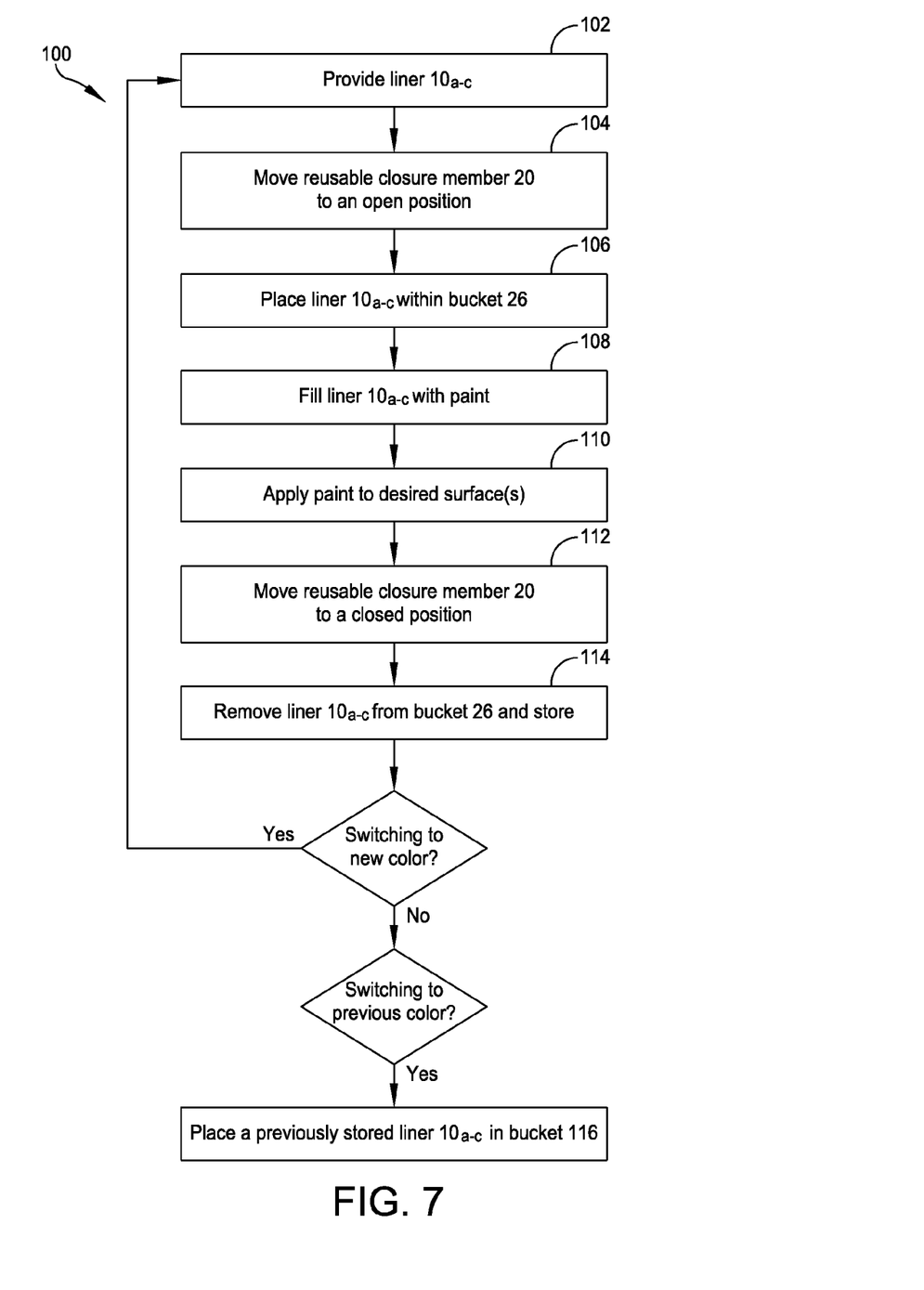
FIG. 7 provides a flow chart depicting an exemplary method of applying paint to a desired surface.

FIG. 7 provides a flow chart depicting an exemplary method 100 for applying paint. Method 100 initiates with the provision of one of liners $10_{a-c}$ of the type discussed above (102) and continues when a user moves reusable closure member 20 of liner $10_{a-c}$ to an open position (104). Next, the user may place liner $10_{a-c}$ within bucket 26 (106) such that bottom seam 14 and top periphery 18 of liner $10_{a-c}$ connects with bottom surface 28 and folds over open top end 30 of bucket 26, respectively. Once liner $10_{a-c}$ is in place, the user may fill liner $10_{a-c}$ (108) with paint and proceed to apply (110) the paint to any surface(s) as desired. When the user is finished with the current paint color, either because he or she is stopping work or wishes to switch colors, the user may unfold top periphery 18 of liner $10_{a-c}$ and move reusable closure member 20 to the closed position (112) before removing liner $10_{a-c}$ (114) from bucket 26 for storage outside the bucket according to method 200, discussed below in reference to FIG. 8. If the user is switching to a fresh color, the user may then reinitiate method 100 using a new liner $10_{a-c}$. Alternately, the user may place a previously stored liner $10_{a-c}$ (116) in bucket 26 to effectively toggle between colors without breaking to clean bucket 26.

Figure 8:
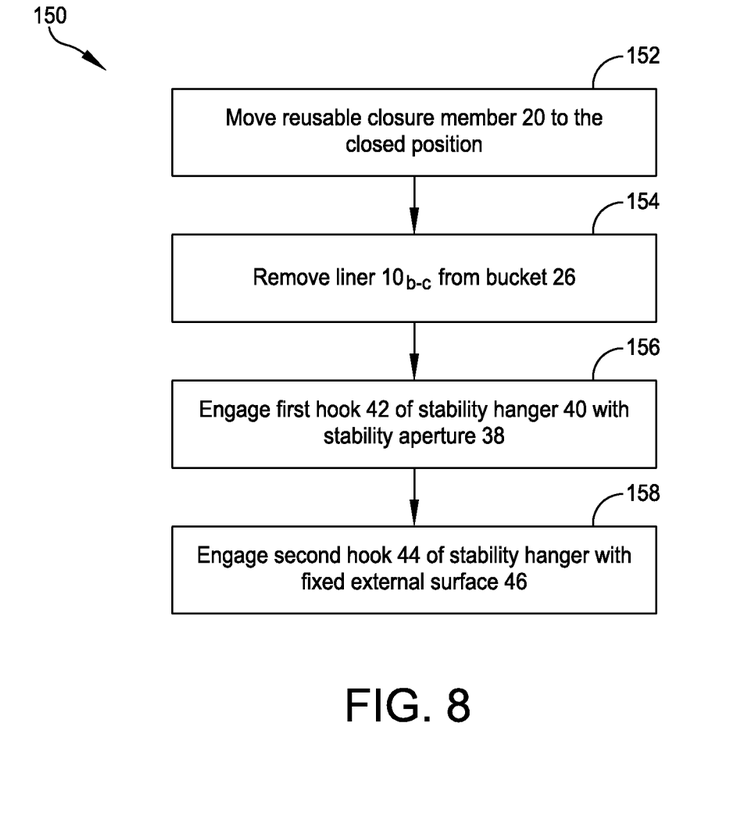
FIG. 8 provides a flow chart depicting an exemplary method of storing embodiments of the disposable liners of FIGS. 1-6.

FIG. 8 provides a flow chart depicting an exemplary method 150 for storing liquid or solid content 34 contained within liner $10_{b-c}$. Method 150 initiates when a user moves reusable closure member 20 of liner $10_{b-c}$ within bucket 26 from the open position to the closed position (152) and removes liner $10_{b-c}$ from bucket 26 (154). Next, the user may engage first hook 42 of stability hanger 40 with stability aperture 38 of liner $10_{b-c}$ (156) and engage second hook 44 with fixed external surface 46 (158) to support liner $10_{b-c}$ in the upright position. Once liner $10_{b-c}$ has been stored, the user may replace the stored liner with a new liner in bucket 26 or with a liner that had been previously used and stored until needed once more.

While method 150 is discussed in specific relation to liners $10_{b-c}$, all liners $10_{a-c}$ may be stored by simply removing the liners from bucket 26 and setting them aside. Stability aperture 38 and stability hanger 40 simply provide a mechanism for holding liners $10_{b-c}$ upright in the event that a user desires to keep reusable closure member 20 free and clear of contents 34.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A disposable liner for a five-gallon bucket having a bottom surface, inner and outer sidewalls, and an open top end, said liner comprising:

a flexible bag having two side seams, a bottom seam, a top periphery in opposition to the bottom seam, and an integrated reusable closure member configured to move between open and closed positions, said bottom seam configured to rest on said bottom surface of the bucket and said top periphery configured to fold over the top end of the bucket, said flexible bag further comprising a perforated seam extending from a first one of said side seams to said bottom seam, thereby forming a triangular tear-away portion that encompasses a limited portion of each of said first one of said side seams and said bottom seam, wherein when said bag is filled with content, placed within the bucket, and said reusable closure member is placed in said open position, said bottom seam contacts the bottom surface of the bucket and said top periphery folds over the open top end of the bucket such that said reusable closure member abuts the outer sidewall of the bucket.

2. The disposable liner of claim 1, wherein when said bag is placed within the bucket, when said reusable closure member is placed in said open position, and when said bag is filled with the content to the open top end, said bag conforms to the inner sidewall of the bucket and said top periphery of said bag folds over the open top end of the bucket such that said reusable closure member abuts the outer sidewall of the bucket.

3. The disposable liner of claim 2, wherein the content is liquid.

4. The disposable liner of claim 1, wherein said flexible bag is formed from first and second sheets, each having top and bottom ends and first and second sides, wherein said first and second sheets are permanently mated along said first and second sides and said bottom ends, and wherein said reusable closure member is offset from said top ends.

5. The disposable liner of claim 4, wherein said reusable closure member comprises a zip lock formed of interlocking grooved and ridged tracks.

6. The disposable liner of claim 4, wherein said first sheet includes a first aperture between said top end of said first sheet and said reusable closure member and said second sheet includes a second aperture between said top end of said second sheet and said reusable closure member, and wherein said first and second apertures align to form a stability aperture when said reusable closure member is in said closed position.

7. The disposable liner of claim 6, wherein said stability aperture is sized to receive a stability hanger, said stability hanger configured to support said flexible bag in an upright position when said reusable closure member is in said closed position and said flexible bag is removed from the bucket.

8. A bucket-and-liner system, comprising:
a bucket having a bottom surface, inner and outer sidewalls, and an open top end; and
a flexible bag, comprising:
 a bottom seam;
 two side seams;
 a top periphery;
 a perforated seam extending from a first one of said side seams to said bottom seam, thereby forming a triangular tear-away portion that encompasses a limited portion of each of said first one of said side seams and said bottom seam; and
 an integrated reusable closure member configured to move between open and closed positions, wherein:
the bottom seam is configured to rest on the bottom surface of the bucket and the top periphery is configured to fold over the top end of the bucket;
when the flexible bag is filled with content, placed within the bucket, and the reusable closure member is placed in the open position, the bottom seam contacts the bottom surface of the bucket and the top periphery folds over the open top end of the bucket such that the reusable closure member abuts the outer sidewall of the bucket; and
when the reusable closure member is placed in the closed position, the flexible bag together with the content form a sealed and removable module.

\* \* \* \* \*